United States Patent
Koskinen et al.

(10) Patent No.: US 7,039,420 B2
(45) Date of Patent: May 2, 2006

(54) METHOD AND A SYSTEM FOR PRESENTING REMINDERS IN A PORTABLE DEVICE

(75) Inventors: Harri Koskinen, Tampere (FI); Kimmo Kauvo, Vammala (FI); Teppo Kivento, Tampere (FI); Jarkko Leino, Tampere (FI); Janne Karjalainen, Tampere (FI); Jari Kaikkonen, Kangasala (FI); Kim Simelius, Tampere (FI); Tommi Ojala, Tampere (FI)

(73) Assignee: Nokia Corporation, Espoo (FI)

( * ) Notice: Subject to any disclaimer, the term of this patent is extended or adjusted under 35 U.S.C. 154(b) by 414 days.

(21) Appl. No.: 10/386,331

(22) Filed: Mar. 11, 2003

(65) Prior Publication Data

US 2004/0192311 A1    Sep. 30, 2004

(30) Foreign Application Priority Data

Mar. 11, 2002    (FI)    .................................. 20020455

(51) Int. Cl.
*H04Q 7/20*    (2006.01)
(52) U.S. Cl. ............................... 455/456.1; 455/456.2; 455/456.6
(58) Field of Classification Search ........... 379/201.07, 379/207.03, 207.12; 455/456.1, 456.2, 456.3, 455/456.6
See application file for complete search history.

(56) References Cited

U.S. PATENT DOCUMENTS

| 5,790,974 | A | 8/1998 | Tognazzini |
| 6,177,905 | B1 | 1/2001 | Welch |
| 6,266,612 | B1 | 7/2001 | Dussell et al. |
| 6,484,033 | B1 * | 11/2002 | Murray .................... 455/456.3 |
| 2001/0007441 | A1 | 7/2001 | Yamamoto |

FOREIGN PATENT DOCUMENTS

| EP | 1 087 316 | 3/2001 |
| EP | 1213659 | 6/2002 |
| WO | WO 00/41428 | 7/2000 |
| WO | 0104577 | 1/2001 |

* cited by examiner

*Primary Examiner*—Bing Q. Bui
(74) *Attorney, Agent, or Firm*—Alfred A. Fressola; Ware, Fressola, Van Der Sluys & Adolphson LLP (57) ABSTRACT

The present invention relates to a method for activating actions. The method comprises the steps of defining an action, a portable device (9) related to it and, as a condition for activating the action, at least one item of position data, and determining the position of the portable device (9). When the position of the portable device (9) corresponds to the position data defined in an action, said action is activated. In the method, the information about actions is processed in a server (2), from which a data transmission connection can be set up to the device, in which the action data is transmitted from the server (2), to be activated.

20 Claims, 5 Drawing Sheets

METHOD AND A SYSTEM FOR PRESENTING REMINDERS IN A PORTABLE DEVICE

CROSS-REFERENCE TO RELATED APPLICATIONS

This application claims priority under 35 USC §119 to Finnish Patent Application No. 20020455 filed on Mar. 11, 2002.

FIELD OF THE INVENTION

The present invention relates to a method for activating actions, for example, presenting reminders, by defining an action, a portable device related to it, and at least one item of position data as a condition for activating the action, and by determining the position of the portable device, wherein when the position of the portable device corresponds to the position data defined for an action, said action is activated. Further, the invention relates to a system comprising means for activating actions, a related portable device and at least one item of position data being defined for the action as a condition for activating the action, and which system further comprises positioning means for determining the position of the portable device, and means for comparing the position of the portable device and the position data defined for an action, wherein said action is arranged to be activated when the position of the portable device corresponds to the position data defined for an action. Further, the invention relates to a server to be used in a system comprising means for activating actions, a related portable device and at least one item of position data being defined for the action as a condition for activating the action, and which system further comprises positioning means for determining the position of the portable device, and means for comparing the position of the portable device and the position data defined for an action, wherein said action is arranged to be activated when the position of the portable device corresponds to the position data defined for an action. Further, the invention relates to a portable device comprising means for activating actions, a related portable device and at least one item of position data being defined for the action as a condition for activating the action, and which portable device is arranged to be used in a system comprising positioning means for determining the position of the portable device, and means for comparing the position of the portable device and the position data defined for an action, wherein said action is arranged to be activated when the position of the portable device corresponds to the position data defined for an action.

BACKGROUND OF THE INVENTION

Portable electronic devices are known to comprise various calendar functions and reminder functions. Examples of such devices to be mentioned in this context include portable communication devices, such as Nokia Communicator 9210, personal digital assistants (PDA), laptop PCs, and palmtop PCs. Also several mobile phones today have calendar functions and reminder functions.

The user can use the calendar functions for recording various events, such as meetings, appointments, trips, visits, etc. for the respective point of time in a memory of the device. Normally, it is possible to provide such calendar notes with a reminder, wherein the device will remind the user of an event, for example the beginning of a meeting.

One drawback in the devices equipped with such calendar functions is, for example, the fact that it is not possible to define such events which are not dependent on a particular point of time but which are rather related to a particular location, to at least some extent. For example, a person would like to be reminded of doing the shopping. In the calendar functions, the person could make an entry of this, for example, for the current date, and a reminder for a time estimated in advance to be suitable, for example for the time when he/she will probably be on his/her way home from work. However, the person is not necessarily close to a shop when the reminder comes; for example, he/she may have been delayed when leaving the place of work. Thus, the reminder may come too early and the person may forget it. On the other hand, the reminder may come so late that the person has already passed the shop and may already be at home when the reminder comes. On the other hand, an event may be such that it is not easy to define a suitable time for reminding of it. Such a situation is, for example, the purchase of an item in such a place which is not close to a location where the person has daily errands. In this case the person would like to be reminded when he/she is close to such a place. With conventional calendar functions and reminder functions, it is not possible to record such an event so that the reminder would, for sure, come at a suitable moment.

Sometimes, in families and between friends, there may be situations in which there is an errand to run, for example to buy travel tickets or to do the shopping. In such a case, it would be advantageous that the errand would be run by the person best suited for doing it. Such a person is, for example, a person who is moving in a region where the errand can be run. However, it is not always known if there is anybody close to such a location, wherein the person commissioning the errand should inquire several persons, for example by phone, who could run the errand. Such a round of inquiries may require several telephone calls, most of which are unnecessary for running the errand. This will cause unnecessary costs and take time of the person commissioning the errand as well as the persons contacted.

U.S. Pat. No. 6,177,905 presents a system, in which the user of a wireless device, such as a wireless phone, a car phone, or another programmable portable device, may set reminders based on location. Thus, the user enters a desired reminder and sets coordinate data for it, on the basis of which the user wants the reminder to be presented in the device. The device is provided with a positioning receiver for receiving signals from satellites of the GPS system and for performing positioning of the device. This positioning data is transmitted to the device in which the data is compared with the coordinate data related to the reminders. If the coordinate data of a reminder corresponds to the current position data of the device, the message related to the reminder is presented to the user. In this way, the user can receive reminders, for example, when approaching a post office or a shop. In the coordinate data, it is also possible to define a range (distance from the location of the coordinates), wherein the reminder is given when the user comes within this range. However, this system has the disadvantage that, for example, location-specific reminders can be entered in the device by the user only. Furthermore, the reminders take no notice of the moment of time when the user is in the location complying with the coordinate data defined in the reminder. Thus, the reminder may be useless, if the errand related to the reminder cannot be run at the time in question, for example when the shop is closed.

SUMMARY OF THE INVENTION

It is an aim of the present invention to provide a method and a system for performing an action handling application in a server. In an advantageous embodiment of the invention, the user can enter data about location-specific actions such as reminders which can be supplemented with time data. The action can thus be restricted to apply to a given time (time range) only. Furthermore, information about actions can also be entered by other persons than the user of the device. The invention is based on the idea that the action handling application is run in a server, from which a data transmission connection can be set up to a portable device, wherein information about actions defined in the action handling application is transmitted to the portable device. To put it more precisely, the method according to the present invention is primarily characterized in that the information about actions is processed in a server, from which a data transmission connection can be set up to the device, to which the information about the action is transmitted from the server, to be activate the action. The system according to the present invention is primarily characterized in that the system comprises a server with means for processing information about actions, and means for transmitting information related to actions from the server to the device in which the action is arranged to be activated. The server according to the present invention is primarily characterized in that the server comprises means for processing information about actions, and means for transmitting information related to actions from the server to the device in which the action is arranged to be activated. Furthermore, the portable device according to the present invention is primarily characterized in that the portable device comprises means for receiving data related to actions, which data are transmitted from the server of the system which comprises means for processing information about actions, and means for transmitting data related to actions from the server to the device in which the action is arranged to be activated.

The present invention shows remarkable advantages over solutions of prior art. In the system according to the invention, also other persons than the user of the portable device can enter information in the user's application for handling actions, such as a reminder application. Thus, definition data for a location-specific action can be transmitted to the user without the user needing to set such an action him/herself. Moreover, the person entering the action data does not need to try to reach the user to notify about such an action. In the system according to the invention, an action can also be entered in such a situation in which the user's portable device is not turned on or it is not logged in a communication network, such as a mobile communication network. Thus, the person entering the action data does not need to wait until the portable device is turned on again and the data transmission connection between it and the communication network is in operation. The action or the information related to it is transmitted to the portable device by the system.

In the method and system according to an advantageous embodiment of the invention, it is also possible to define a time in connection with the action, to be used in addition to position data as a condition for activating the action. Thus, even if the user were in a location complying with the position definition related to an action, the reminder is not presented in the portable device, if the time data does not match. Thus, the unnecessary activation of actions is avoided, for example, in a situation in which the user is close to a shop when the shop is closed. Also, in a situation in which the user is, for example, on his/her way to work at a given time and does not want actions to be activated, this time data can be utilized to prevent the activation of actions at said time. In the method according to an advantageous embodiment of the invention, it is also possible to define a validity period for the action, wherein if the conditions for activating the action are not met during the validity period defined for the action, the data related to the action is deleted. Thus, the system will not be subjected to unnecessary loading with actions which are no longer valid. In the method according to an advantageous embodiment of the invention, an action can also be deleted as a response to other events, such as the fact that the errand related to the actions has been run by another user of the system.

DESCRIPTION OF THE DRAWINGS

In the following, the invention will be described in more detail with reference to the appended drawings, in which.

DETAILED DESCRIPTION OF THE INVENTION

Figure 1:
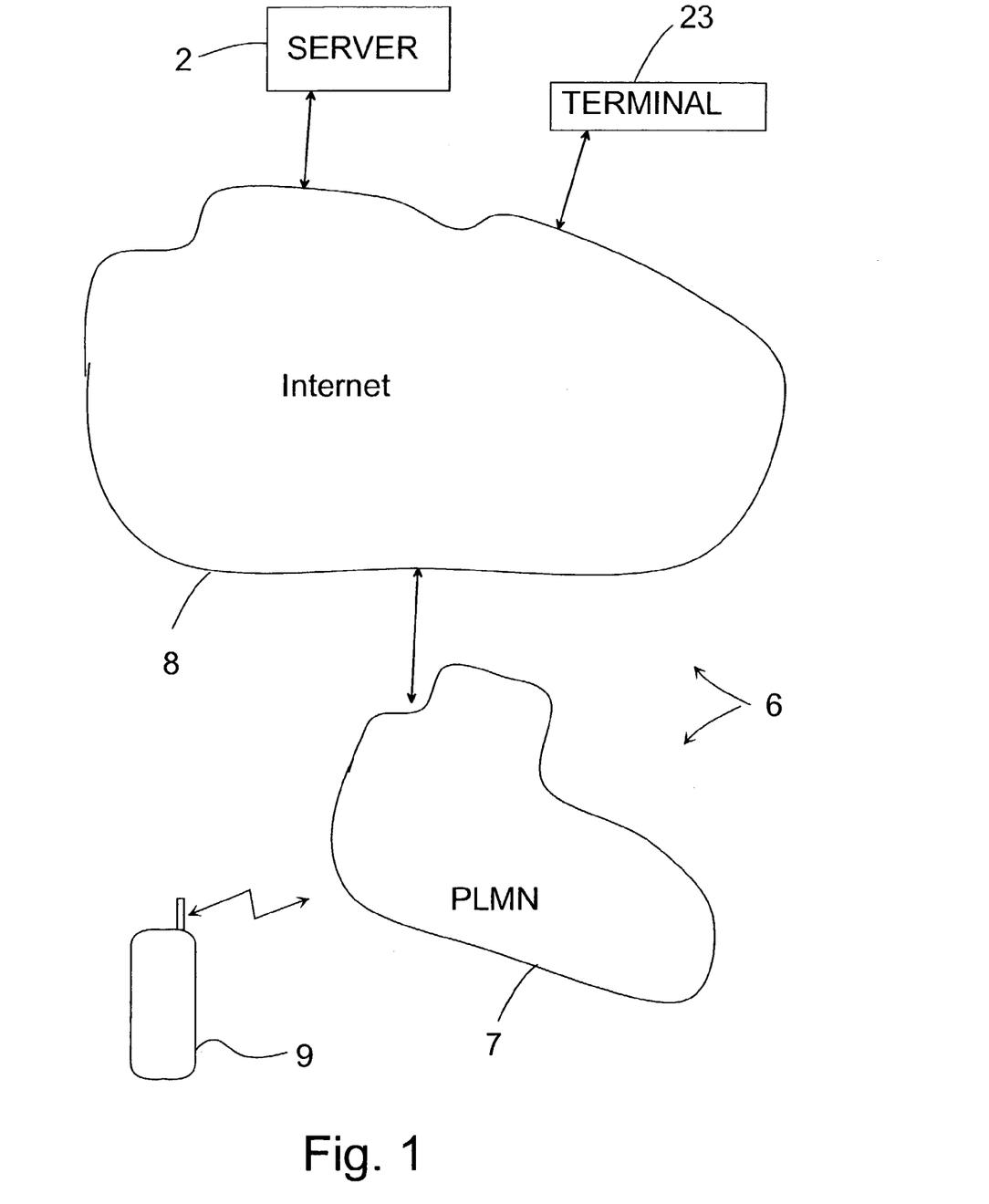
FIG. 1 shows a system according to an advantageous embodiment of the invention in a reduced chart.

FIG. 1 shows a system 1 according to an advantageous embodiment of the invention. It preferably comprises at least one server 2 with means, 3, 4 for performing actions, such as reminder functions. Furthermore, the server 2 comprises communication means 5 for data transmission between the server 2 and a communication network 6. The communication network 6 can be any communication network in which data can be transferred electronically. In practical applications, the communication network 6 may comprise more than one communication network, such as a mobile communication network 7 (public land mobile network, PLMN) and the Internet data network 8. Furthermore, the structure of such communication networks 6 is prior art known by anyone skilled in the art, wherein it is not necessary to describe them in more detail in this context. Furthermore, the system comprises a portable device 9, such as a portable communication device, a laptop computer, a personal digital assistant, or the like. It is obvious that different users and even the same user may have several different portable devices, in connection with which the invention can be applied. The system also comprises positioning means 10 for determining the position of the portable device 9. In the system of FIG. 1, these means 10 may comprise a GPS positioning receiver (shown in phantom) which is placed in connection with the portable device 9 (either inside—shown—or outside of portable device 9—see FIG. 3—), but it is obvious that other positioning means can be applied as well. In some applications, the position data can be determined, for example, by means of the mobile communication network 7, preferably by means of the base stations (not shown) of the mobile communication network 7. Thus, the portable device 9 does not need to comprise positioning means, but the position data is transferred from the mobile communication network 7 to the device running the action application such as reminder application, preferably the server 2.

In the following, the invention will be described in more detail by using reminders and reminder applications as non-restrictive examples of the actions. However, the invention is not restricted to reminders but also other actions can be used and activated by the present invention. Some other actions to be mentioned here are sending a message back to the sender of the action data, send location report of the device, send a periodic location request from the device to locate it, executing another application in the device, etc.

Figure 2:
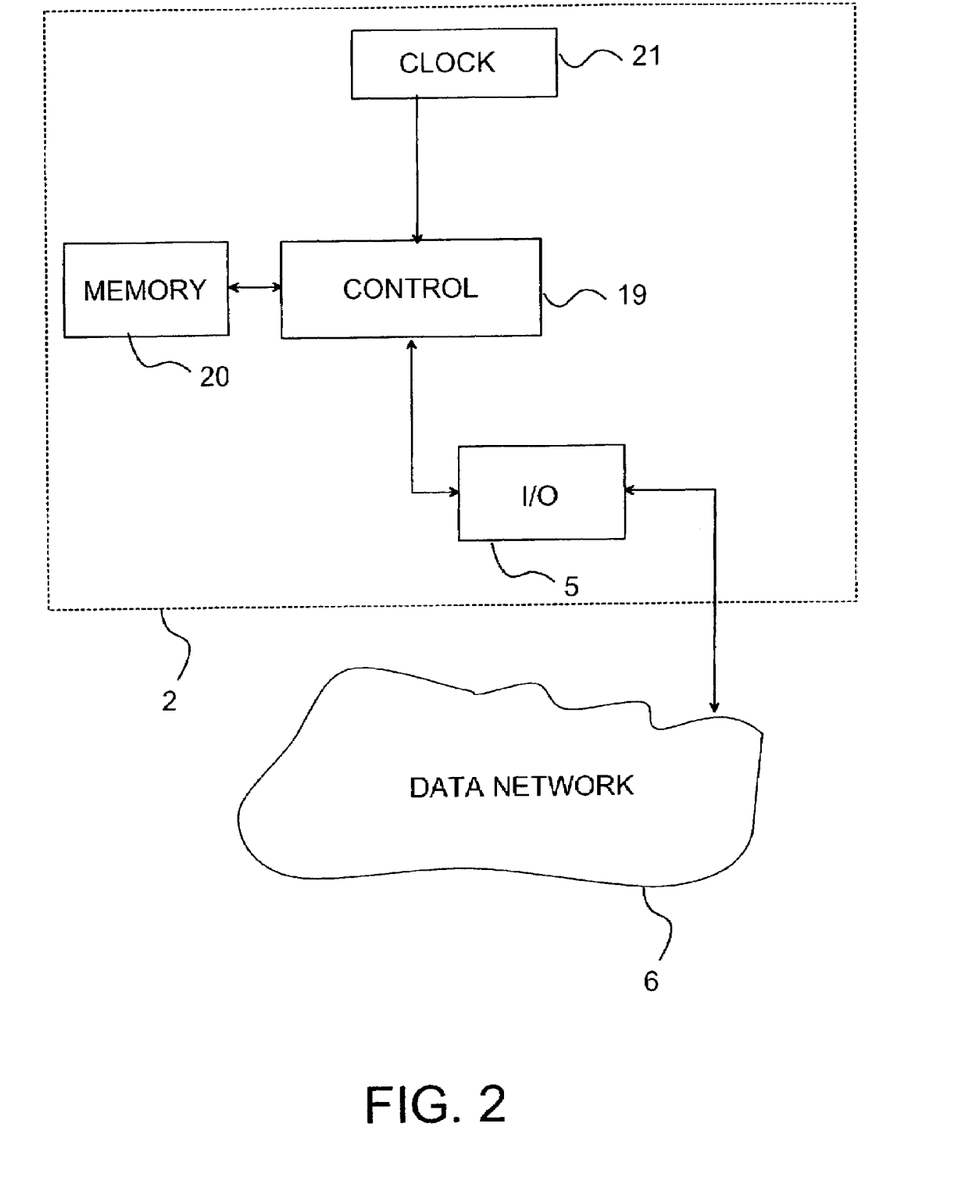
FIG. 2 shows a server according to an advantageous embodiment of the invention in a reduced block chart.

FIG. 2 shows the structure of the device 2 according to an advantageous embodiment of the invention in a reduced block chart. FIG. 2 primarily shows the blocks which are significant for applying the present invention. The server 2 comprises a control block 19 for controlling the functions of the server 2. Furthermore, the server 2 comprises memory means 20 and communication means 5. Via the communication means 5, the server can communicate with the communication network 6. Preferably, the functions of the reminder application can be largely implemented as program commands by means of the program code of a control block 19. This program code is preferably stored in memory means 20 of the server. Preferably, the definitions, user-specific data etc. related to the reminder application are also stored in the memory means 20. Furthermore, the server 2 comprises means 21 for maintaining time data. These means 21 comprise, for example, a real time clock, but the time data can also be obtained in another way; for example, it can be received via the communication network 6 from a service providing time data (not shown).

Figure 3:
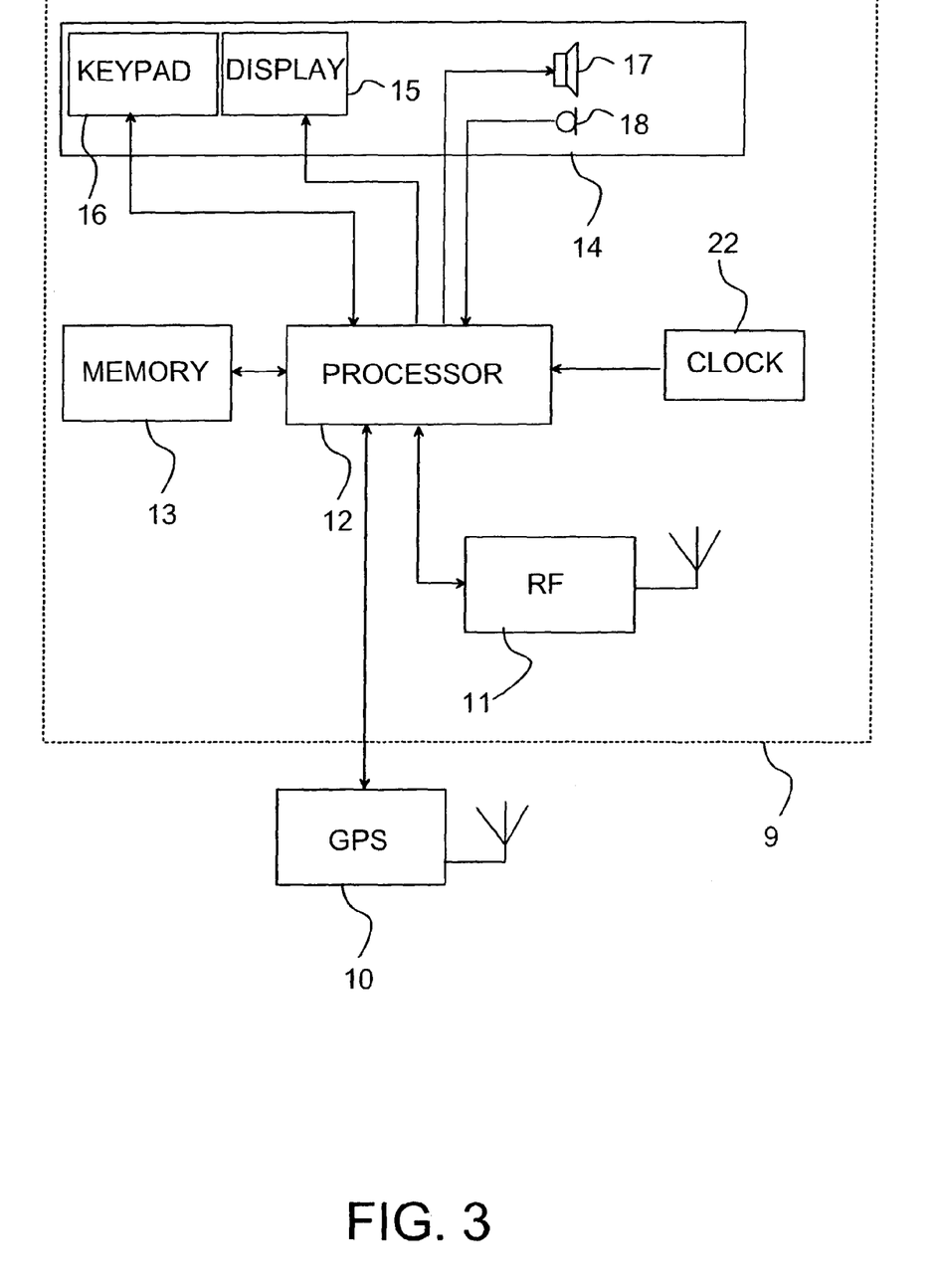
FIG. 3 shows a portable device according to an advantageous embodiment of the invention in a reduced block chart.

FIG. 3 shows the structure of the portable device 9 according to an advantageous embodiment of the invention in a reduced block chart. The portable device 9 comprises communication means 11, such as mobile communication means, including a transmitter and a receiver. By these communication means 11, it is possible to exchange information relating, e.g. to the reminder application, between the portable device 9 and the server 2. Further, the portable device 9 comprises a processor 12, such as a micro controller unit (MCU), memory means 13, and a user interface 14. The user interface 14 preferably comprises a display 15, a keypad 16, an earpiece and/or a speaker 17, as well as a microphone 18. By means of the user interface 14, the user can enter information to the portable device 9 and receive information, for example information related to reminders. Also, the portable device 9 may comprise means 22 for maintaining time data, if polling of the data of the reminder application is also performed in the portable device 9. This polling of the information of the reminder application will be described below in this description.

With respect to the present invention, the following essential functions can be defined: the maintenance of data of the reminder applications, such as reminders, the determination of the position data of the portable device 9, the maintenance of time data, the comparison between the position data related to reminders and the position data of the portable device, as well as the comparison between possible time data related to the reminders and the current moment of time. These different functions can be implemented in different parts of the system 1. The following is a presentation of some advantageous embodiments of the invention, in which said essential functions are implemented in different locations, as well as of particular features related to these different embodiments. Reminders related to the invention can also be called location-dependent reminders, referring to such reminders for which position data is one condition for presenting. Such reminders, as such, are not necessarily dependent on calendar data, such as the date, but it is possible to define time data as one condition for presenting them. However, it is obvious that, within the scope of the invention, location-dependent reminders can also be entered and used in other applications than a particular reminder application, so that the invention is not limited to reminder applications only. For example, it is possible to supplement a calendar application with properties of processing location-dependent reminders according to the invention.

Figure 4:
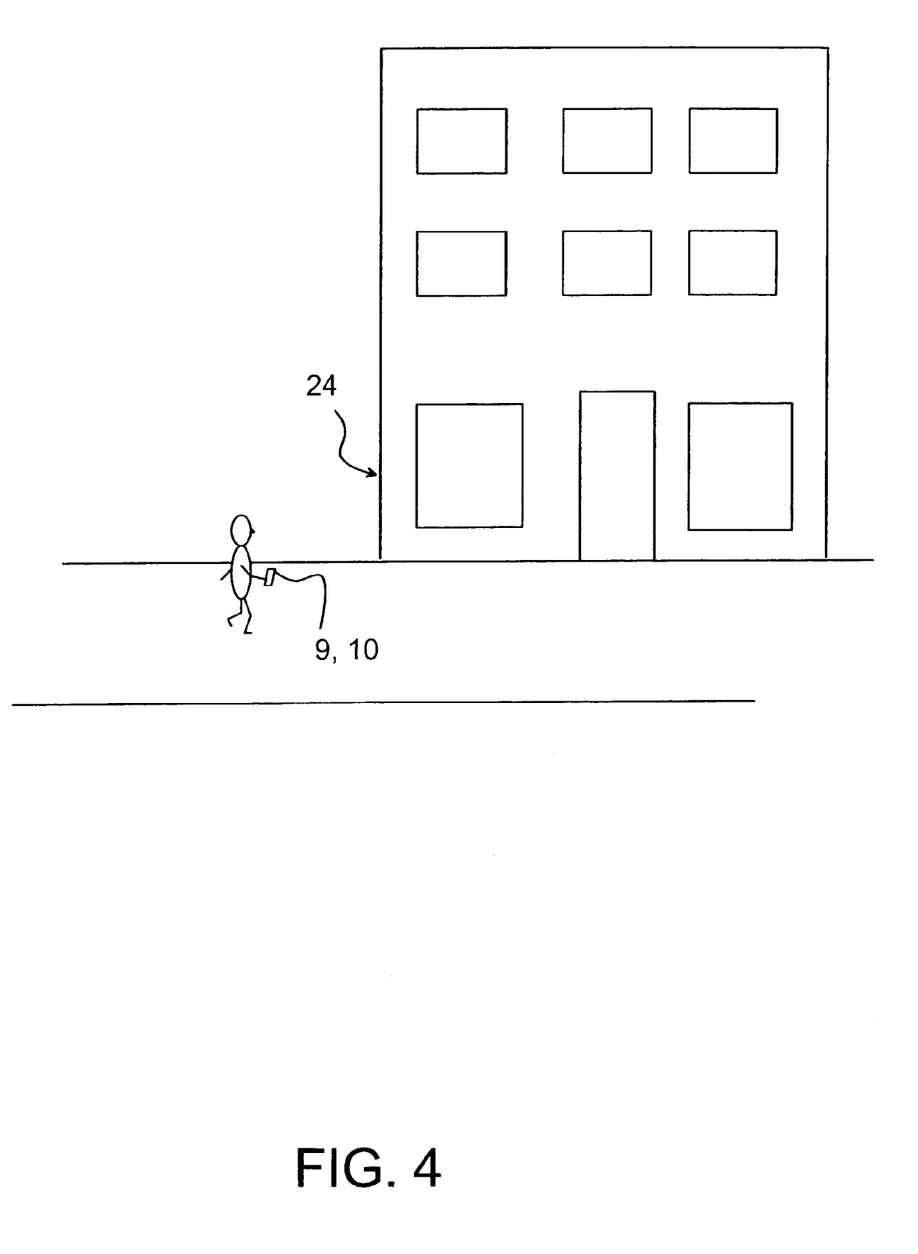
FIG. 4 shows a situation, in which the invention can be applied.

In a first advantageous embodiment of the invention, the reminder application and the maintenance of time data are implemented in a server 2. Thus, the portable device 9 is primarily used for presenting information which is necessary for the use of this reminder application as well as for editing the reminder data. Thus, to use the reminder application in the portable device 9, the user starts an application program which is used for presenting data, entering data, and transmitting data between the server 2 and the portable device 9. Such an application program can be, for example, similar to a WWW browser, known as such, wherein the portable device 9 is primarily used as a remote terminal for presenting data related to the reminders to the user and for transmitting data entered by the user to the server 2. For entering data, it is possible to use, for example, a keypad 16, a microphone 18, a touch-sensitive means (not shown), or the like. Thus, the application program transmits information necessary for using the reminder application to the server 2, preferably via communication means 11. This data preferably contains user related information, such as a user identification and a password, a telephone number, or another corresponding identification. The server 2 examines the received information and determines the person whose reminder data are to be processed. The server 2 retrieves the user-specific data of the reminder application from the memory means 20 and transmits it to the portable device 9, in which the data is preferably presented on the display 15 and/or in the earpiece 17. The user can browse the reminders, edit them and add new reminders. In connection with adding such a location-dependent reminder, position data is defined, to be used as a criterion for presenting the reminder. Changes and/or new entries made in the reminder data are transmitted from the portable device 9 to the server 2, in which the data are stored in the user data. After this, the polling functions of the reminder application will monitor the meeting of the criteria related to the reminders preferably in the following way, with reference to FIG. 4.

In this embodiment, it is also assumed that the positioning means 10 are arranged in connection with the portable device 9. Thus, the positioning means 10 comprise, for example, a GPS receiver. The positioning means 10 perform positioning preferably at intervals and/or by a separate control command. In this embodiment, the position data is transmitted from the portable device 9 to the server 2, in which the received position data is compared with the conditions, such as position data, related to presenting the reminders and defined by the user in question. If the position data corresponds to the position data of a reminder, for example in the situation of FIG. 4 when the user is approaching a shop 24, this reminder is presented in the portable device 9. Thus, the server 2 transmits at least a message or another definition (presentation data) related to the reminder, indicating what kind of a reminder is to be formed in the portable device 9. This data can be, for example, a text-format notice, a picture, a sound, an animation, a vibration, or a combination of these. The portable device 9 receives the presentation data related to the reminder and presents this data as visual and/or audio information in the user interface 14. The user can then acknowledge the received reminder and either delete it or re-activate it. Information about the user's choice is transmitted to the server 2, in which the reminder is either deleted or re-activated. Re-activation may be necessary, if the user does not, in spite of the reminder, want to perform the task requested in the reminder at the moment in question. Thus, next time when the user comes within the range meeting the conditions of the position data, the reminder will be presented again in the above-described manner. The invention can also be applied in such a way that operations by the user are not needed in connection with the reminder, but the reminder is automatically either deleted or re-activated. In the reminder data, it is also possible to define if the user is to be requested to acknowledge the reminder or if the deletion or re-activation is to be performed automatically.

After the processing of one reminder, the next reminder is preferably processed, if the number of set reminders is more than one. The reminder processing functions are iterated as long as there are active, user-specific reminders stored in the server 2. The server 2 can preferably process reminders of several different users, although the case of one user is primarily discussed in this specification.

In a second advantageous embodiment of the invention, the positioning means 10 are not necessarily implemented in the portable device 9, but the position data of the portable device 9 is obtained by other means. It can be determined, for example, in the mobile communication network 7. It is known as such that the mobile communication network 7 and the portable device 9 with mobile communication functions communicate at intervals also when there is no active call from the mobile station. Thus, the coordinate data of the base station serving the portable device 9 can be used as the default position data for the portable device 9. Also, systems have been developed, in which preferably three or more base stations can be used to determine the position of a portable device 9 at a relatively good accuracy. In this second advantageous embodiment, the position data is transmitted from the mobile communication network 7 to the server 2, in which this position data is used as described above in connection with the description of the first embodiment of the invention. In other respects, this second advantageous embodiment is essentially similar to the first advantageous embodiment. The difference lies primarily in that the position data does not need to be transmitted from the portable device 9, wherein the power consumption of the portable device 9 can be reduced to some extent and the communication network 6 is not subjected to unnecessary loading in this respect and there are savings in the communication costs.

The present invention can also be applied in such a way that the reminder application is implemented both in the server 2 and in the portable device 9. Thus, the data of the reminder applications of the server 2 and the portable device 9 are synchronized preferably at intervals to secure that the reminder data of the same user are substantially identical in both reminder applications. In this third advantageous embodiment of the invention, the synchronization can be preferably implemented in such a way that when the reminder data are changed in either one of the reminder applications, the changed data are also transmitted to the other reminder application. Thus, for example in a situation, in which a person authorized by the user of the portable device 9 adds a new entry in the user's reminder data in the reminder application in the server 2, the server 2 will transmit the data of this new entry to the portable device 9, in which the data are stored in the memory means 13. If necessary, the user of this portable device 9 can be informed of the setting of such a reminder, wherein he/she can be prepared for the presentation of the reminder and even plan his/her travel route so that he/she can run the errand requested in the reminder.

Also in this third advantageous embodiment of the invention, the positioning means 10 can be implemented in the portable device 9 and/or elsewhere in the system, preferably in the communication network 6. Thus, the comparison between the position data defined for the reminders and the position data of the portable device 9 can be made either in the portable device 9 or in the server 2.

If said positioning means 10 are arranged in connection with the portable device 9 and the comparison is made in the portable device 9, the position data do not need to be transmitted to the communication network 6. If the comparison shows that the position data of the portable device 9 matches with the position data defined in a reminder, the notification defined for this reminder is presented in the user interface 14 of the portable device. Also, information about the fulfilment of the condition for presenting the reminder is transmitted to the server 2, in which the reminder is preferably deleted. Also, such reminders whose presentation condition has been met, are preferably deleted from the reminder application of the portable device 9. On the other hand, in some applications, it may be necessary to set reminders which are always repeated when the conditions are met. In this case, these reminders are not deleted. Such reminders can be used, for example, for setting a schedule, if the events of a schedule, for example lectures, are not compulsory, or otherwise as a memory help for persons who find it difficult to remember even regularly recurring events, for example for some old people. Consequently, in this embodiment, the data related to the reminder application do not need to be transferred to the communication network except when a condition for presenting a reminder is met. In this embodiment, the portable device 9 does not even need to be logged in the communication network 6 during the comparison, wherein possible blackouts in the data transmission connection do not disturb the comparing operation of the reminder application. Thus, changes in the data of the reminder application of the portable device 9 can be transmitted at the stage when the data transmission connection is possible again.

If the positioning means 10 are arranged in the communication network 6, the comparison between the position data of the reminders and the position data of the portable device 9 is preferably made in the server 2. Thus, the position data is transmitted from the communication network 6 to the server 2. If the comparison shows that the position data of the portable device 9 matches with the position data set for a reminder, this information is transmitted to the portable device 9, in which the notification set for this reminder is presented in the user interface 14 of the portable device. As above, also in this fourth advantageous embodiment of the invention, the reminder data are preferably deleted from the reminder applications of both the portable device 9 and the server 2. Also in this embodiment, it is possible that the position is determined in the portable device. In this case, the position data are transmitted from the communication network 6 to the portable device 9, in which the comparison is made as described above in connection with the description of the third advantageous embodiment of the invention.

Some different embodiments of the invention have been described above. In connection with all of these, it is possible to use not only position data but also time data as a criterion for presenting the reminder. Thus, the reminder data indicates the time when the reminder is to be presented if the position data of the portable device 9 match with the position data of the reminder. Thus, in addition to the comparison of the position data, the time data is compared with the current moment of time. The reminder in question is to be presented only if the moment of time matches with the time data. This use of the time data has the advantage that, for example, the reminder will not be presented when the task related to the reminder cannot be performed or the user does not want to perform it at that time. One example to mention is the opening hours of a shop. If the reminder relates to, for example, an errand in a shop, at a pharmacy or in another business, the reminder will preferably not be presented if the business is not open when the user is in the vicinity of this business. On the other hand, the user does not necessarily want to do the shopping, for example, on his/her way to work but first on his/her way home, wherein also such a point can be taken into account in the time data. Also in other respects, this time data does not need to match with the opening hours of the business, but it can be defined to slightly differ from it. For example, the person entering a reminder sets, as the terminal moment of a time window, a time before the closing time of the business, because the user will not necessarily have time to make a purchase if he/she enters the business right at the closing time or only slightly before it. In a corresponding manner, when setting the initial moment of the time window, it is also possible to set a time slightly before the opening time of the business, wherein the user will be able to decide, after noticing the reminder, whether or not he/she will wait for the business to open or do the shopping later on.

The comparison of the time data is preferably made in the same reminder application in which the comparison between the position data and the position data of the portable device 9 is made. The server 2 shown in FIG. 2 comprises means 21 for maintaining time data, wherein the current time is known in the server 2. Also, the portable device 9 shown in FIG. 3 comprises corresponding means 22 for maintaining time data, wherein the current time is also known in the portable device 9. If the device 2, 9 which makes the comparison does not comprise said means 21, 22 for maintaining time data, the time data can be transmitted via the communication network 6 from a device which maintains time data. For example, if the comparison is made in the portable device 9 which does not comprise means for maintaining time data, and the server 2 comprises said means 21 for maintaining time data, the portable device 9 may transmit a request to the server to transmit the time data. Thus, the time data is transmitted from the server 2 to the portable device 9, after which the time data can also be compared in the portable device 9.

In the systems according to the invention, it is not necessary to make the comparisons of the time data and the position data in the same device 2, 9. Thus, one device, for example the server 2, is used for comparing the time data, and another device, for example the portable device 9, is used for comparing the position data with the position data of the portable device 9. In this embodiment, the results of both of the comparisons are, however, processed in the device in which the final decision about presenting the reminder is made. To clarify this, an exemplary application will be used, in which the server 2 compares the time data and the portable device 9 compares the position data, and the final decision about presenting the reminder is made in the portable device 9. Thus, the server 2 compares, at intervals, the time data related to the reminders with the current moment of time. If the current time matches with the time data of a reminder, this information will be transmitted by the server to the portable device 9. Thus, the portable device 9 will still compare the position data of the reminder with the current position data of the portable device 9, and if they match, the data related to said reminder will be presented in the user interface 14 of the portable device. However, if the portable device 9 is not in a location matching with the position data of the reminder in question, the reminder will not be presented. The portable device 9 can make a new position data comparison later on. No comparison needs to be made for such reminders in which the time condition is not met. To reduce unnecessary communication, the server 2 will not transmit data related to the same reminder several times, even in the case the portable device 9 was not in the location indicated by the position data when the comparison was made. Preferably, data related to the reminder will only be transmitted when a change takes place in the conditions for presenting the reminder, i.e. primarily at the stage when the server 2 finds that the time condition is met and when the server finds that the time condition is no longer met. Preferably, after receiving the data, the portable device 9 stores it in a memory and uses this stored data to determine if there is a need to compare the position data of the reminder in question. Naturally, also in this embodiment, it is obvious that the comparison can also be made in another order, i.e. by comparing the position first, and if the position complies with the position setting for any reminder, the time data will then be compared.

Figure 5:
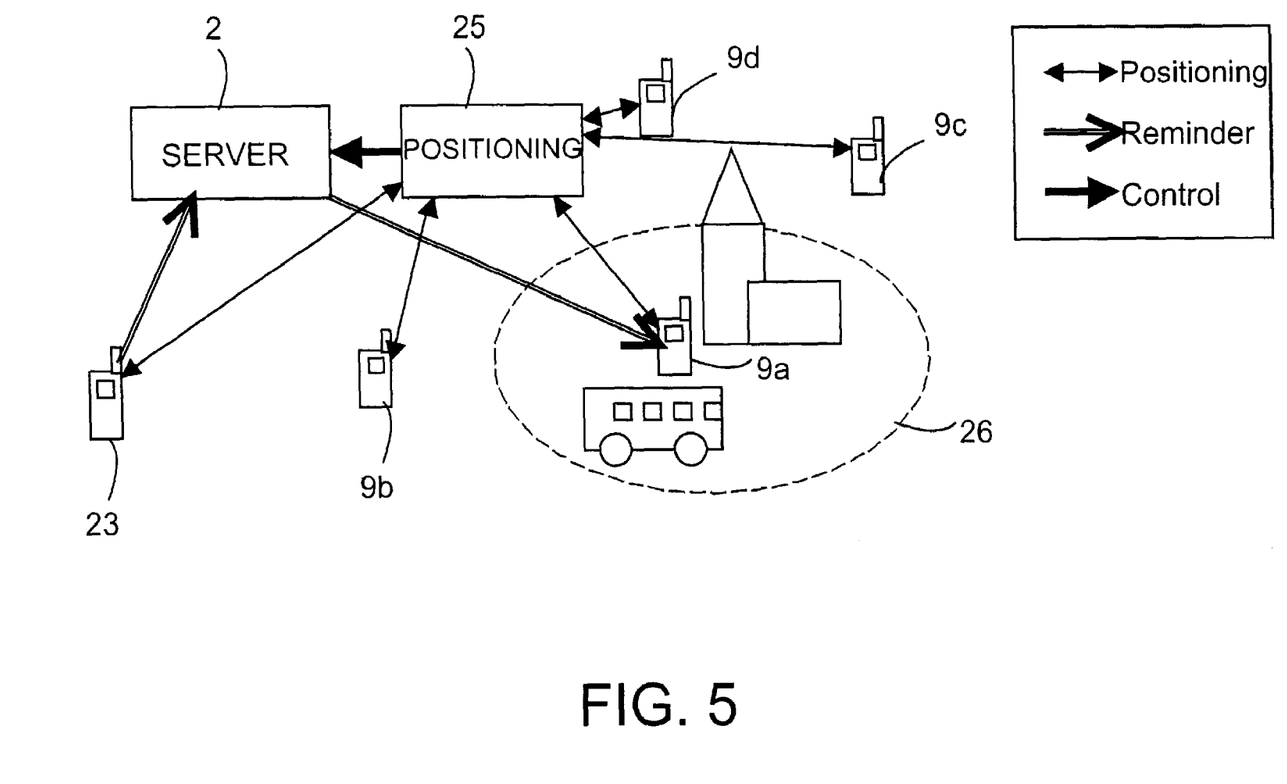
FIG. 5 illustrates another situation, in which the invention can be applied.

In yet another advantageous embodiment of the invention, which is exemplified in the appended FIG. 5, the same reminder can be set for more than one person. Thus, the person who is going to set a reminder, enters the data of the reminder, such as the notification, position data and possible time data related to the reminder, preferably by his/her own terminal 23, such as a wireless communication device. Furthermore, the person defines the persons for which the reminder is set. These persons can, in an advantageous case, also include the person setting the reminder. This setting can be performed, for example, in such a way that the person setting the reminder selects, from the data of persons and/or groups of persons stored in the memory means of his/her own device and/or in the server 2, those for whom the reminder is to be set. After this, the server 2 enters the reminders in the data of the selected persons in the memory means of the server 2. Furthermore, the data are preferably transmitted to the portable devices 9a, 9b, 9c, 9d of said persons. After this, the system polls the reminder data, such as the time data and/or the position of each portable device 9a, 9b, 9c, 9d, as described above in this specification. The position of the portable devices 9a, 9b, 9c, 9d can be polled, for example, by positioning means 25 provided in the mobile communication network, or by positioning means arranged in connection with the portable devices. In case one of the portable devices (the portable device 9a in FIG. 5) is in the location 26 indicated by the reminder and possibly at the time set in the reminder, the notification related to the reminder will be presented in this portable device 9a. After this, the user of the portable device 9a can preferably choose, whether or not to perform the task requested in the reminder. In case the user of the portable device 9a performs the requested task, information about this is transmitted to the system, preferably to the server 2 and to the device of the person who set the task. The reminder can now be deleted from the system, unless it is such a reminder which is to be repeated every time the conditions are met. If the user in question does not, for any reason, perform the task requested in the notification, information about this is also preferably transmitted to the system and possibly also to the person who set the task. In this case, the reminder is not deleted, but the polling of the fulfilment of its conditions is continued. However, it can now be assumed that the user of the portable device 9a who indicated that he/she is not going to perform the task, is to be deleted from the watch of this reminder. Thus, the reminder can be presented in such another portable device 9b, 9c, 9d in which the same reminder has been set and which enters the location defined in the position data at a suitable time.

The user of the device 9a which presented the reminder can preferably select, what kind of a notification will be sent to the system and to the person who set the task. One alternative is a so-called anonymous notification, if the receiver of the notification does not necessarily want to disclose that he/she is in the location in question. Thus, the person who set the task will not necessarily be sent any notification, if the receiver of the notification will not perform the task requested. If the task is performed, a notification of this is preferably transmitted to the person who set the task, without information about the identity of the person who performed the task. In one alternative, such a notification is only transmitted to the person who set the task but the task is not deleted.

Another alternative is that the person who received the notification transmits a message to the person who set the task, irrespective of whether the person who received the notification will perform the task or not. Thus, the recipient of the notification can, for example, indicate the reason why he/she cannot perform the requested task at that moment.

If none of the persons defined in the reminder will perform the task even though they have been moving near the location set in the reminder, information about this is preferably transmitted to the person who set the task. He/she can then decide whether or not to try to ask yet another person to perform the task. In the positive case, the reminder is set in the data of this other person and deleted from the data of those persons who have indicated their refusal to perform the task.

In the above-described embodiment, the person who set the task can define also him/herself as a recipient of the reminder. Thus, if the person who set the reminder performs the requested task him/herself, the reminder can be deleted and the reminders to the other persons will be recalled as unnecessary.

By the above embodiments, it is also possible to provide services by which a group of people can meet each other. This is implemented so that the person who sets the task defines not only his/her friends but also him/herself as a recipient. Also, he/she preferably sets as a condition that the person who sets the task must be in a particular location and that the reminder must only be transmitted within a particular time range. In this way, for example when moving close to a particular location, a group of people can receive a reminder to meet each other in this location, for example in a cafe. Furthermore, the person who sets the task can set an additional condition that the reminder is only to be transmitted to a predetermined number of people, after which it is deleted. This gives the advantage that if several people are required to perform the task, or if the person who set the task or an appointment only wants to meet a few friends, the system will not call all the friends of the person who have joined the system and are located near the defined location. This may be necessary, for example, if the person who sets the task wants to play a game with only one of his/her friends and the number of players is limited. Such games include a number of popular sports, such as tennis, squash or snooker.

Yet another advantageous embodiment of the invention to be mentioned is the situation, in which for example the chairman of a meeting, the host of a business visit or another person arranging an event selects the persons whom he/she wants to participate in the meeting, business visit or other event. Thus, the host of the event sets a position-dependent notification in the system, with the location of the event as the position data. Furthermore, data is set about the persons invited to the event. In this application, when the conditions are met, a notification is delivered to the host of the event, but a notification, such as a greeting message, can also be set for the location-dependent reminder. This notification is delivered to an invited person when he/she is approaching the place where the event is held. The system according to this embodiment operates in such a way that when an invited person comes close to the place where the event is held, the system will detect this and transmit a notification about the arrival of the person to the host of the event. If a notification has been defined for the location-dependent reminder, this is transmitted to the person in question. An advantage of this application is, for example, that the receiving personnel do not need to notify about the arrival of persons and, on the other hand, the host of the event does not need to wait in advance for the arrival of invited persons at the location where the event is held. The host of the event can arrive, for example, after being informed by the system that one of the invited persons is approaching the place. Furthermore, when some of the guests are present, the host of the event can spend time with them and still, being informed of the arrival of the next person, meet him/her as well. The location-specific reminder is preferably deleted from the system after all the invited persons have arrived or after the event has ended.

The above-presented advantageous embodiments of the invention can still be supplemented with the feature, whereby the person setting a reminder can notify the system of a maximum storage time of the reminder (validity period of the reminder). This may be necessary, for example, in such tasks which are not sensible or possible to perform after a given time. For example, it is no longer sensible to maintain a reminder of buying tickets for an event after this event. Thus, the reminders may include two or more items of time data to be watched.

Some persons may have more than one portable device 9 at their disposal. However, the person does not necessarily have a separate subscriber identity module, such as a SIM card or USIM card (UMTS Subscriber Identity Module), for each portable device 9, but the person sets this identity module in the portable device 9 which he/she is going to use each time. Thus, it is advantageous that the person related to a reminder is not identified on the basis of the identity data of the portable device 9 of this person (for example, the International Mobile Equipment Identity, IMEI) but, for example, on the basis of the subscriber identity of this person (for example, the International Mobile Subscriber Identity, IMSI).

Above in this specification, it has been presented that the positioning means 10 used can be, for example, a GPS receiver and/or the mobile communication network 7, but it is obvious that also other positioning means can be used in connection with the present invention. One example to be mentioned is the utilization of short-range communication means, such as a wireless local area network (WLAN) and devices equipped with Bluetooth facilities. The portable device 9 is thus equipped with corresponding local communication means (not shown). In such a system, the portable device 9 can use the local communication means to listen, if there is a corresponding transmitting device in the vicinity. For example, if a business is equipped with a device implemented with local communication means to transmit a signal, the portable device 9 can detect this signal and thereby conclude that it is in the vicinity of this business. This information can be used in the portable device 9 as a criterion for meeting the position condition. Consequently, in such a system, it is not necessary to include coordinate data in the position data. If signals from several different local communication means can be received simultaneously, the signal can be provided with identifying data, for example the name of the business, type, etc. This identifying data can be compared with corresponding data in the reminder to determine whether the position condition of the reminder is met.

Consequently, when defining a reminder, one should in some way indicate the location, in whose vicinity the reminder is to be presented. The setting of the position condition can be implemented, for example, so that the person who sets the reminder enters the coordinate data and possibly a range or defines in another way the area in which the user must be located before the reminder is presented. On the other hand, it is possible to pre-define in the portable device 9, in the server 2, or in the communication network 6, some common position data or some position data which the user will often need, wherein a suitable one can be selected from such a list each time. Systems can also be developed, in which for example central firms, private entrepreneurs, etc. can store position data of their own business/businesses in the system, from which the person setting up a reminder can search for the desired position data.

The system according to the invention, in which the reminder application is run in at least the server 2, provides e.g. the advantage that also other persons than the user of the portable device 9 can enter reminders relating to the user. This is implemented preferably so that the user has informed the system of data on the persons who are authorized to set reminders for the user. Such persons authorized by the user can contact the server 2 by their own terminal 23 (FIG. 1), such as a computer, a wireless communication device, etc. The server 2 authenticates such a person, for example, on the basis of the user identity given by the person, the terminal identity, such as the IP address, the telephone number, or the like. The person can then enter a desired reminder in the user's reminders, including the respective conditions for its presentation, or if necessary, edit a reminder that has been set by him/her earlier. For example, the user's spouse may add a reminder in which he/she asks the user to go grocery shopping on his/her way home from work. The reminder is preferably supplemented with information about the person who entered the reminder.

It is also possible that another person sends information to the user's device about an action to be activated when the user leaves a certain area, for example, leaves the office the user is working. The information about the action include, which action is to be activated, the location or area to be watched, etc. The action can the be a reminder to be presented, a message to be sent to the user and/or the other person, a control signal for controlling some other equipment, etc. Such a control signal can be used, for example, to initiate a heating system/air conditioner to rise/decrease temperature of an apartment, lock the doors of the office and/or activate the alarm system of the office. The control signal can be formed e.g. in the user's device which receives the data relating to the action to be activated.

It is obvious that the server 2 must not be interpreted in a restricted way to cover only computers of a given type, but the server 2 can be any device provided with data processing facilities and used as a part of a larger system. Some advantageous examples to be mentioned include a mobile switching centre in a mobile communication system, a short message service centre, a server in the Internet data network, a server in a local area network, or the like.

Only a few advantageous applications of the invention have been exemplified above; however, it is obvious that a person skilled in the art will be able to utilize the above description to apply the invention also in other embodiments of the invention in accordance with the appended claims.

The invention claimed is:

1. A method for activating actions, comprising the steps of defining an action, a portable device related to it, and at least one item of position data as a condition for activating the action, and determining the position of the portable device, wherein when the position of the portable device corresponds to the position data set for the action, said action is activated, wherein the information about actions is processed in a server, from which a data transmission connection can be set up to the device, to which the information about the action is transmitted from the server, to activate the action.

2. The method according to claim 1, wherein the information about the actions is also processed in the portable device, wherein information about the actions is transmitted between the portable device and the server, to synchronize the action data of the server and of the portable device with each other.

3. The method according to claim 1, wherein time data is also set as a condition for activating the action, wherein the action is only to be activated during the time defined in the time data when the position of the portable device corresponds to the position data defined in the action.

4. The method according to claim 1, wherein the conditions for activating the action are examined in the server, wherein if the conditions for activating one of the actions is met, information about said action is transmitted to the portable device, in which the action is activated.

5. The method according to claim 1, wherein the action data is supplemented with a validity time, wherein if the conditions for activating the action are not met within said validity time, the action data is deleted after the expiry of said validity time.

6. The method according to claim 1, wherein a set of portable devices is defined for the action, wherein if the conditions for activating the action are met in one portable device from said set of portable devices, the action is activated.

7. The method according to claim 1, wherein the action is activated in said portable device meeting the conditions for activating.

8. The method according to claim 1, wherein the action is activated in another device than said portable device meeting the conditions for activating.

9. The method according to claim 1, wherein the action is at least one of the following:
    a reminder to be presented,
    a message to be transmitted,
    an application to be executed.

10. A system comprising means for activating actions, which action is provided with a definition of a portable device related to it and at least one item of position data as a condition for activating the action, and which system also comprises positioning means for determining the position of the portable device, and means for comparing the position of the portable device and the position data defined for an action, wherein said action is arranged to be activated when the position of the portable device corresponds to the position data defined for the action, wherein the system comprises a server with means for processing information about actions and means for transmitting information related to actions from the server to the device in which the action is arranged to be activated.

11. The system according to claim 10, wherein the portable device comprises means for processing information about the actions, wherein the system comprises means for transferring data related to actions between the portable device and the server, to synchronize the action data of the server and the portable device with each other.

12. The system according to claim 10, wherein as a condition for activating the action, also time data is defined, and that the system comprises means for examining said time data, wherein the action is arranged to be activated only during the time defined in the time data, when the position of the portable device corresponds to the position data defined in the action.

13. The system according to claim 10, wherein the server comprises means for examining conditions for activating actions.

14. The system according to claim 10, wherein the action data is supplemented with a validity time, and that the system comprises means for examining said validity time, wherein if the conditions for activating the action are not met within said validity time, the action data is arranged to be deleted after the expiry of said validity time.

15. The system according to claim 10, wherein it comprises means for defining a set of portable devices for an action, means for examining the fulfilment of the conditions for activating the action for each portable device from said set of portable devices, and means for activating the action.

16. The system according to claim 10, wherein the action is arranged to be activated in a portable device which meets the conditions for activating.

17. The system according to claim 10, wherein the action is arranged to be activated in another device than that meeting the conditions for activating.

18. The system according to claim 10, wherein the action is at least one of the following:
a reminder to be presented,
a message to be transmitted,
an application to be executed.

19. A server for use in a system comprising means for activating actions, which action is provided with a definition of a portable device related to it and at least one item of position data as a condition for activating the action, and which system also comprises positioning means for determining the position of the portable device, and means for comparing the position of the portable device and the position data defined for an action, wherein said action is arranged to be activated when the position of the portable device corresponds to the position data defined for the action, wherein the server comprises means for processing information about actions, and means for transmitting information related to actions from the server to the device in which the action is arranged to be activated.

20. A portable device comprising means for activating actions, for which action is defined a portable device related to it and at least one item of position data as a condition for activating the action, and which portable device is arranged to be used in a system provided with positioning means for determining the position of the portable device, and means for comparing the position of the portable device and the position data defined for an action, wherein said action is arranged to be activated in the portable device when the position of the portable device corresponds to the position data defined in the action, wherein the portable device comprises means for receiving data related to actions, which data are transmitted from the server of the system which comprises means for processing information about actions, and means for transmitting data related to actions from the server to the device in which the action is arranged to be activated.

* * * * *